United States Patent

Howard et al.

[15] 3,662,333
[45] May 9, 1972

[54] HYDRAULIC ACCUMULATOR CHARGE DETECTOR AND INDICATING SYSTEM

[72] Inventors: Donald W. Howard; Dewey W. Eppley, both of South Bend, Ind.

[73] Assignee: The Bendix Corporation

[22] Filed: Sept. 8, 1970

[21] Appl. No.: 70,255

[52] U.S. Cl..............................340/52 C, 180/103, 188/1 A
[51] Int. Cl. ......................................B60q 1/00, B60t 17/00
[58] Field of Search..........................340/52 C, 60; 188/1 A; 180/103; 73/398 R; 60/54.5 E, 54.6 E

[56] References Cited

UNITED STATES PATENTS

| | | | |
|---|---|---|---|
| 3,511,088 | 5/1970 | Weaver.....................................73/398 |
| 3,573,725 | 4/1971 | Shellhause............................340/52 C |

Primary Examiner—John W. Caldwell
Assistant Examiner—Glen R. Swann, III
Attorney—William N. Antonis, Plante, Hartz, Smith & Thompson and Ken C. Decker

[57] ABSTRACT

In a hydraulic braking system, a means for determining if the charge on an accumulator is low. A pressure sensitive transistor gives an output that is proportional to the pressure in the accumulator. When the brake switch is closed, the output of the pressure sensitive transistor is memorized. After a given time period, if the actual pressure in the accumulator has dropped a predetermined amount below the memorized pressure, an output will light a warning indicator lamp. A latching arrangement will keep the light on even if the pressure later increases and the brake pedal is released.

11 Claims, 6 Drawing Figures

INVENTORS
DONALD W. HOWARD
& DEWEY W. EPPLEY
BY Plante, Hartz, Smith & Thompson
ATTORNEYS

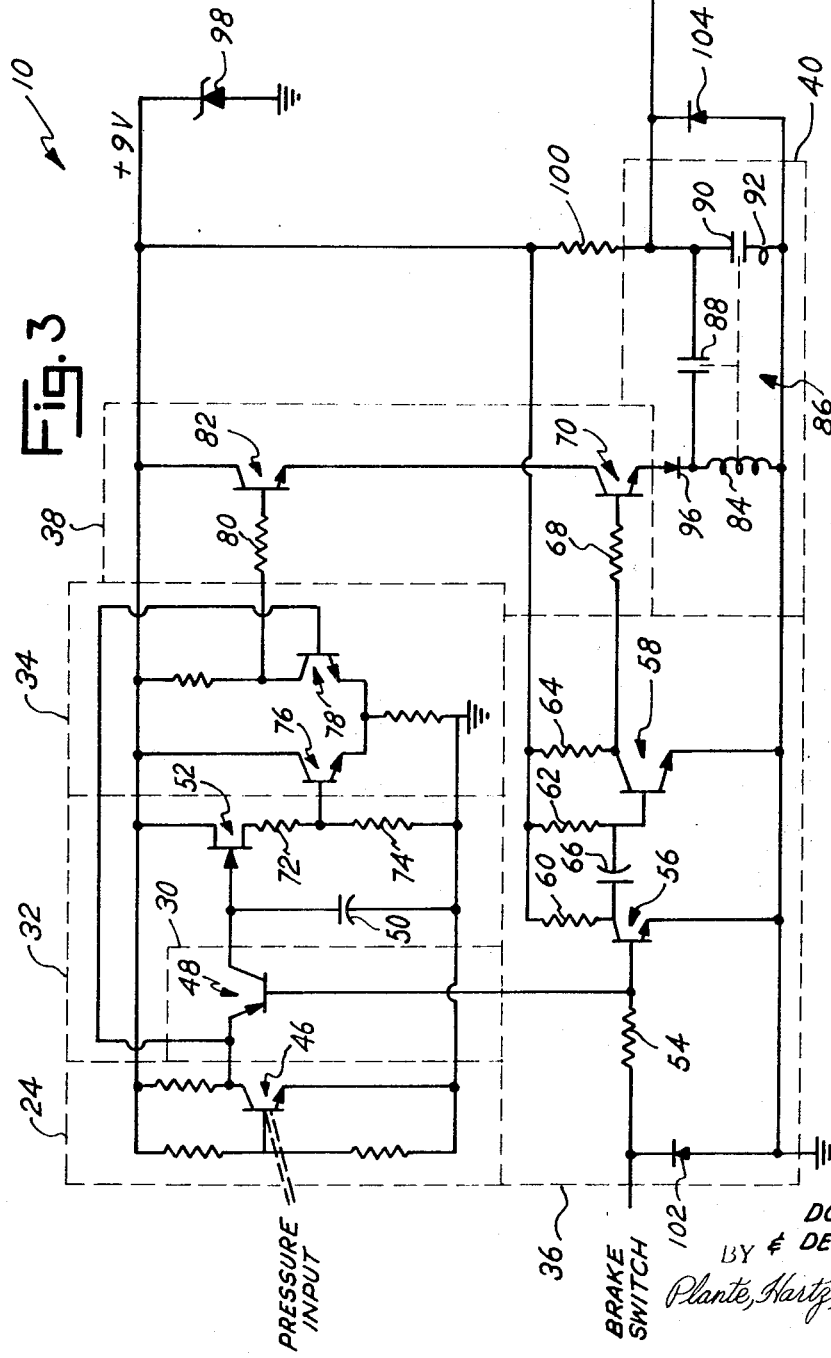

3,662,333

HYDRAULIC ACCUMULATOR CHARGE DETECTOR AND INDICATING SYSTEM

BACKGROUND OF THE INVENTION

Many full power braking systems depend upon an accumulator charged to system pressure having a specific pressure-volume capacity to supplement the hydraulic pump output during brake pedal applications. Most accumulators provide this by a nitrogen gas precharge on one side of a rubber diaphragm that splits the accumulator in two chambers. The other side of the diaphragm, which forms the second chamber, receives pressurized fluid from a pump. The measure of the accumulator capacity is the volume of nitrogen under pressure at the time the brake pedal is pushed. Loss of the nitrogen gas precharge results in a high pressure decay rate with subsequent loss of available brake fluid pressure. The pump will try to maintain brake pressure, but the pump flow rate is much lower than the system demand. Therefore, as the brake pedal is pushed, the demand on the accumulator will rapidly decrease the available pressurized fluid with a much lower fluid pressure being available from the pump.

With the addition of adaptive braking to the automotive vehicle, a much greater demand on the pressure accumulator will be made. Therefore, it becomes essential that the nitrogen gas precharge in the accumulator be maintained within given limits to assure the operator of the vehicle that an adequate nitrogen precharge is available in the accumulator and, consequently, adequate pressurized fluid is available for a normal braking operation, plus being available when a skid condition is sensed. The present pressure indicating system was designed to detect a loss of fluid pressure in the accumulator that may result in the marginal brake application. If during a brake application the change of fluid pressure in the accumulator exceeds a predetermined amount, the present system will convey this information to the vehicle operator in the form of a warning indication device.

SUMMARY OF THE INVENTION

It is an object of the invention to provide a warning when the nitrogen gas precharge of an accumulator is low by measuring the pressure decay rate during a brake application. If the decay rate is high (low nitrogen precharge) a warning device is actuated.

It is a further object of the present invention to utilize a pressure sensitive transistor for giving a voltage output proportional to a pressure input. If the voltage output changes a predetermined amount within a time period, a warning indication is given.

It is an even further object of the invention to memorize an output from a pressure transducer upon receiving a command signal. Thereafter, if the output from the pressure transducer decreases a predetermined amount within a given time period from the memorized pressure, than an output signal will be given.

It is still a further object of the present invention to convert a pressure into a proportional electric signal through a pressure transducer and take the derivative of the proportional electric signal. By comparing the derivative output with a reference derivative, a warning can be given if the reference derivative is exceeded.

It is still a further object of the present invention to show a detailed schematic of one embodiment of a system that monitors the nitrogen precharge in the accumulator to give a warning signal if the precharge is low.

BRIEF DESCRIPTION OF THE DRAWINGS

FIG. 3 is a schematic of the electrical portion of the hydraulic accumulator charge detection and indicating system shown in FIG. 1.

FIG. 4 is an illustrative block diagram of an alternative embodiment for the hydraulic accumulator charge detection and indicating system.

DESCRIPTION OF THE PREFERRED EMBODIMENT

Figure 1:
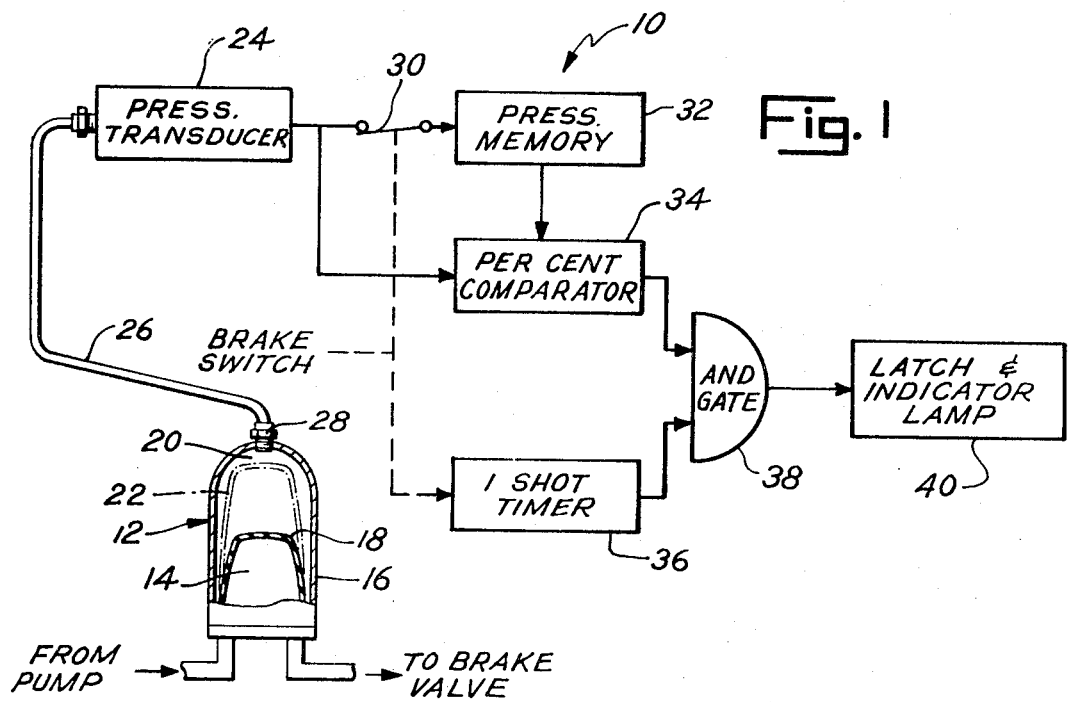
FIG. 1 is an illustrative block diagram of a hydraulic accumulator charge detection and indication system.

Referring to FIG. 1, there is shown the control portion, represented generally by reference numeral 10, of a hydraulic accumulator charge detection and indicating system. An accumulator 12 receives pressurized fluid from a pump that is retained in fluid chamber 14 of housing 16 by means of a diaphragm 18. The gas chamber 20 is formed on the other side of diaphragm 18 in conjunction with housing 16. The substance contained in gas chamber 20 is normally a nitrogen gas that is used to precharge the accumulator. If the nitrogen precharge on the accumulator is low, then the diaphragm 18 will assume the position shown by the dotted line 22. Assume now that the brakes of the automotive vehicle are applied so that fluid leaves fluid chamber 14 going to the brake valve. If the precharge in gas chamber 20 is of a volume formed by diaphragm 18, as shown in solid line, then a relatively constant source of pressurized fluid would be available. However, if the nitrogen gas precharge in gas chamber 20 is of a volume defined by the housing and dotted line 22, which represents diaphragm 18 in the extended position, then a small decrease in pressurized fluid from fluid chamber 14 would result in a substantial decrease in the pressure contained in gas chamber 20. A decrease of pressure in gas chamber 20 will likewise decrease the pressure in fluid chamber 14.

The present invention is directed toward a means of monitoring the loss of a nitrogen gas precharge. The pressure in gas chamber 20 is monitored by a pressure transducer 24 by means of conduit 26 connecting to opening 28 of accumulator 12. It is possible for the pressure transducer 24 to be connected directly to opening 28 so that a conduit 26 is not necessary. Also, since the pressure in chambers 14 and 20 vary at the same rate, pressure transducer 24 could monitor the pressure in fluid chamber 14 instead of the pressure in gas chamber 20. The pressure transducer 24 gives a voltage output that is directly proportional to the pressure in gas chamber 20 or fluid chamber 14.

Upon receiving a command from the brake switch that indicates the vehicle brakes are being applied, memory switch 30 will open allowing the output voltage from pressure transducer 24 to be memorized by pressure memory 32. The pressure memory 32 retains the output of the pressure transducer 24 as long as the brake switch is closed. Also, the output of pressure transducer 24 is fed into percentage comparator 34. If the pressure sensed by transducer 24 drops a given percentage during a brake application, then percentage 34 will have a voltage output.

Simultaneously with the opening of memory switch 30, the brake switch output is fed into a one shot timer 36. The one shot timer 36 will have an output for a given time period (represented by $\Delta t$) from the time that the brake switch command is received. The outputs from one shot timer 36 and percentage comparator 34 forms the inputs to AND gate 38. Hence, if the pressure measured by transducer 24 has decreased a certain percentage as indicated by the output from percentage comparator 34 within the "on" time of the one shot timer 36 so that both inputs are received to AND gate 38, an output will be given. The output from AND gate 38 will light indicator lamp 40 that contains an internal latching circuit to remain lit.

Figure 2A:
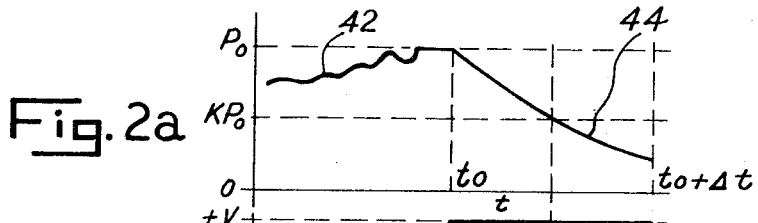
FIGS. 2a, 2b and 2c are illustrative waveforms on the same time scale for the block diagram shown in FIG. 1.

Referring now to FIG. 1 and 2 in conjunction with each other, there is shown in FIG. 2a a plot of accumulator pressure versus time when the nitrogen precharge in the accumulator is low as represented by dotted line 22 in accumulator 12. Portion 42 of the graph shown in FIG. 2a represents the random pressure in gas chamber 20 if the pump is running and vehicle brakes are not applied. At time $t_0$ the vehicle brakes are applied as indicated by decaying portion 44 of FIG. 2a. The pressure at time $t_0$ of brake application is represented by $P_0$. The percentage that the pressure $P_0$ must be decreased before an output is received from percentage comparator 34 is represented by the constant K.

Figure 2B:
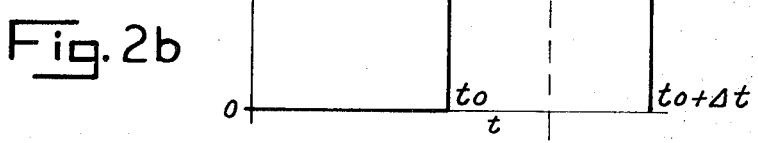
Figure 2C:
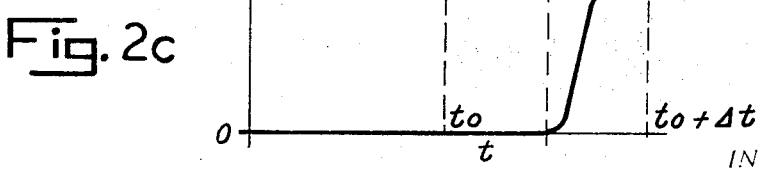

Referring to FIG. 2b, there is shown a graphic illustration of the output voltage from one shot timer 36. At time $t_0$ the voltage output from one shot timer 36 increases to +V voltage. At time $t_0 = \Delta t$, the output from one shot timer 36 decreases to zero volts. In FIG. 2c there is shown the output from percentage comparator 34. Notice that at time $t_0$ the output from percentage comparator 34 is at zero volts and remains at zero volts a short period of time thereafter. However, before $t_0 + \Delta t$, the output of percentage comparator 34 has increased to a voltage of +V. Since both inputs on AND gate 38, represented by FIGS. 2b and 3c, are at a positive voltage level during the same time period, AND gate 38 will give an output to indicator lamp 40. Notice that when the decayed portion 44 of the pressure graph drops below the $KP_0$ line, the voltage output from percent comparator 34, as shown in FIG. 2c, begins to increase. Hence, if the decay portion 44 even decreases below the $KP_0$ line, within the same time period from $t_0$ to $t_0 + \Delta t$, then both inputs to the AND gate 38 will be present and the indicator lamp 40 will light. If the decay portion 44 had not dropped below the $KP_0$ line, which represents the point at which percentage comparator 34 will give an output, or decay portion 44 drops below $KP_0$ after $t_0 + \Delta t$, then no output would even be received by indicator lamp 40.

Referring now to FIG. 3, there is shown a schematic diagram of the control portion 10 of the hydraulic accumulator charge detection and indicating system. A pressure input is fed from accumulator 12 to the pressure sensitive transistor 46. One example of the pressure sensitive transistor 46 is manufactured under the trade name Pitran. However, the pressure transducer 24 could be formed from a solid state resistance bridge network whose resistance values vary as a function of pressure input. One manufacturer of the resistance bridge network is Fairchild Controls/A Division of Fairchild Camera and Instrument Corporation.

The voltage at the collector of pressure sensitive transistor 46 is directly related to the pressure input from accumulator 12. This voltage is fed through transistor 48 to capacitor 50 connected to ground and to the gate of field effect transistor 52. Upon applying the vehicle brake, a command from the brake switch is received through resistor 54 which feeds to the base of transistor 48. This command which stops the conduction of transistor 48 isolates the gate of field effect transistor 52 from the pressure sensitive transistor 46. Therefore, the charge on capacitor 50, which is proportional to the accumulator pressure at time $t_0$ when the brake is applied, will be memorized.

Simultaneously, a timer formed by transistors 56 and 58 in conjunction with resistors 60, 62 and 64 and capacitor 66 is initiated. The time constant is determined by capacitor 66 and resistor 62 to form the time interval from $t_0$ to $t_0 + \Delta t$, or the $\Delta t$ time interval normally in the range of 20 to 80 milli-seconds. During the $\Delta t$ time interval, the collector of transistor 58 is at a high voltage represented by the logic level 1. The voltage at the collector of transistor 58 is fed through resistor 68 to change AND gate transistor 70 to the conducting stage if a positive voltage is applied to the collector.

Resistor 72 and 74 form a voltage dividing network between field effect transistor 52 and ground, which corresponds to the desired percentage decrease in accumulator pressure during the time period determined by capacitor 66 and resistor 62. The source voltage of field effect transistor 52 as derived from capacitor 50 will be divided between resistor 72 and 74 with the junction of the resistors being connected to the base of transistor 76. Transistor 76, in conjunction with transistor 78, forms a comparator with a relatively high gain. The decrease in accumulator pressure after the command is received from the brake switch to stop the conduction of transistor 48 is sensed by pressure sensitive transistor 46. The decreasing voltage at the collector of pressure transistor 46 is coupled to the base of transistor 78. If the voltage coupled to the base of transistor 78 continues to decrease below an established reference, the transistor 78 will be cut "off" raising the collector to a high voltage potential or a logic level of 1.

A logic 1 output from transistor 78 is coupled through resistor 80 to the base of AND gate transistor 82. If a voltage is being received at the base of AND gate transistor 82, and at the base of AND gate transistor 70, they will begin to conduct from the +9 volt line to ground. The current through AND gate transistors 82 and 70 will flow through coil 84 to energize relay 86. Upon energization of relay 86, the contacts 88 and 90 will close. Contact 90 connects the indicator line 92 to the battery supply of +12 volts. Contact 88 latches the coil 84 to the battery supply so that, as long as the ignition switch is "on," relay 86 will remain energized. Relay 86 can be replaced by an SCR to perform the identical function of relay 86.

Diode 96 prevents reverse current through AND gate transistor 70 and 82 since the indicator line 92 is operated from the battery supply of +12 volts while the rest of the system utilizes a regulated +9 volt supply. The regulated +9 volt supply is obtained from zenor diode 98 that is connected from ground through a dropping resistor 100 to the +12 volt supply. Diodes 102 and 104 remove the negative transients from the brake switch and the battery supply, respectively. The remaining un-numbered resistors in the schematic are normal biasing or current limiting resistors whose use is known to those skilled in the art.

An alternative embodiment of the hydraulic accumulator charge detection and indicating system is shown in FIG. 4. Therein the output from the pressure transducer 24 is fed through coupling resistor 106 to pressure derivative amplifier 108. The derivative part of pressure derivative amplifier 108 is determined by capacitor 110 and resistor 112. The output of pressure derivative amplifier 108 is a voltage proportional to the rate of change of the output of pressure transducer 24, and represented by the letter P, is given as $dP/dt$. The rate of change of pressure $dP/dt$ is fed into comparator 114. Also being fed in comparator 114 is a reference rate of change of $dP/dt$. If the rate of change of the pressure $dP/dt$ from pressure derivative amplifier 108 exceeds the reference derivative, then comparator 114 will have a voltage output that operates switch 116. The output from switch 116, which forms a latching type of network, will keep an output voltage that lights indicator lamp 118 until the ignition switch is turned "off."

Clearly, the output from switch 116 in FIG. 4 or the output from AND gate 38 in FIG. 1 could be used to give any type of warning to the operator of the vehicle, such as a buzzing horn, flashing light or other types of warning systems. Also, the rate of change of accumulator pressure during a brake application may vary from one vehicle system to another vehicle system. Therefore, the derivative reference point or the percentage comparison may vary from one automotive system to another automotive system. Also, the $\Delta t$ time interval may vary according to the response time of the individual brake system. Though not disclosed in the present invention, a self test of the circuit shown in FIG. 3 may be achieved by the conventional momentary contact in the ignition switch. Further, a flashing indication of the warning lamp may be incorporated by including a gate that periodically disconnects the warning lamp at a frequency of 0.5 to 5 cycles per second.

I claim:
1. A pressure indicating system, comprising:
   transducer means for giving a voltage signal proportional to a pressure input;
   means for memorizing said voltage signal when a command signal is received;
   means for comparing said memorized voltage signal with the existing voltage signal from said transducer means to give a signal output when the existing voltage signal has changed a predetermined amount with reference to said memorized voltage signal; and
   means for gating said signal output from said comparing means to give an indication if said signal output occurred within a predetermined period of time after said command signal.
2. The pressure indicating system, as recited in claim 1, wherein said predetermined amount of change indicates a decrease in said pressure input.

3. The pressure indicating system, as recited in claim 2, wherein said gating means includes a timer means activated by said command signal and a gate that gives an indication voltage output if an input is received from said timer and said signal output from said comparing means.

4. The pressure indicating system, as recited in claim 2, wherein said indication is provided by means which includes an indicator lamp and latch means operated when said output signal is received through said gating means to maintain a warning indication.

5. The pressure indicating system, as recited in claim 3, wherein:
said pressure input is received from a pressure accumulator of a braking system; and
said command signal is a voltage from a brake switch in said braking system, said brake switch being closed when the brakes are applied.

6. In a hydraulic braking system having a pressurized fluid accumulator, an accumulator pressure indicator system comprising:
a source of pressurized fluid;
a housing for said accumulator, said housing being connected to said source of predetermined fluid;
diaphragm means for dividing said housing into a first and second chamber, said first chamber receiving said pressurized fluid and said second chamber containing a pressurized gas;
transducer means connected to one of said first and second chambers for giving a voltage proportional to the pressure in said chamber;
means for determining changes in said proportional voltage for a unit of time, said predetermining means giving an output if said change exceeds a predetermined amount; and
means for indicating if said output exists.

7. The accumulator pressure indicator system, as recited in claim 6, wherein said determining means includes:
means for memorizing said proportional voltage upon receiving a command from a brake switch means; and
means for comparing said memorized proportional voltage with the actual proportional voltage so that, if the actual proportional voltage had decreased said predetermined amount in said unit of time, said output will be obtained.

8. The accumulator pressure indicating system, as recited in claim 6, wherein said determining means includes:
means for taking the derivative of said proportional voltage; and
means for comparing said derivative with a reference, said reference representing a change in said proportional voltage for said unit of time as said unit of time approaches zero, said comparing means giving said output if said reference change has been exceeded.

9. The accumulator pressure indicator system, as recited in claim 7, wherein said transducer means is a pressure responsive transistor.

10. The accumulator pressure indicator system, as recited in claim 9, wherein said indicating means includes an indicator lamp and latch means.

11. The accumulator pressure indicator system, as recited in claim 10, wherein said latch means includes a relay with appropriate contacts.

* * * * *